United States Patent
Jung et al.

(10) Patent No.: US 10,321,425 B2
(45) Date of Patent: Jun. 11, 2019

(54) METHOD FOR TRANSMITTING, BY TERMINAL, SYNCHRONIZATION SIGNAL FOR DEVICE-TO-DEVICE (D2D) OPERATION IN WIRELESS COMMUNICATION SYSTEM, AND TERMINAL USING METHOD

(71) Applicant: LG ELECTRONICS INC., Seoul (KR)

(72) Inventors: Sunghoon Jung, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 31 days.

(21) Appl. No.: 15/523,333

(22) PCT Filed: Nov. 3, 2015

(86) PCT No.: PCT/KR2015/011720
§ 371 (c)(1),
(2) Date: Apr. 28, 2017

(87) PCT Pub. No.: WO2016/072711
PCT Pub. Date: May 12, 2016

(65) Prior Publication Data
US 2017/0245233 A1    Aug. 24, 2017

Related U.S. Application Data

(60) Provisional application No. 62/074,095, filed on Nov. 3, 2014.

(51) Int. Cl.
*H04W 4/00* (2018.01)
*H04W 56/00* (2009.01)
(Continued)

(52) U.S. Cl.
CPC ....... *H04W 56/0025* (2013.01); *H04W 56/00* (2013.01); *H04W 76/10* (2018.02);
(Continued)

(58) Field of Classification Search
None
See application file for complete search history.

(56) References Cited

U.S. PATENT DOCUMENTS

2014/0126527 A1* 5/2014 Xiong ............... H04W 72/0413
                                                            370/329
2014/0128092 A1* 5/2014 Xiong ................... H04W 24/02
                                                            455/454
(Continued)

FOREIGN PATENT DOCUMENTS

KR    20130063644    6/2013
WO    2014058221     4/2014
(Continued)

OTHER PUBLICATIONS

PCT International Application No. PCT/KR2015/011720, International Search Report dated Mar. 31, 2016, 2 pages.
(Continued)

*Primary Examiner* — Bob A Phunkulh
(74) *Attorney, Agent, or Firm* — Lee, Hong, Degerman, Kang & Waimey

(57) ABSTRACT

Provided are a method for transmitting, by a terminal, a synchronization signal for a device-to-device (D2D) operation in a wireless communication system, and a terminal using the method. The method comprises the steps of: transmitting a synchronization signal for a D2D operation (D2D synchronization signal: D2DSS) in an RRC (radio resource control) idle state; entering an RRC connected state; and transmitting the D2DSS even after entering the RRC connected state if a certain condition is met.

14 Claims, 21 Drawing Sheets

(51) Int. Cl.
*H04W 76/10* (2018.01)
*H04W 76/14* (2018.01)
*H04W 76/27* (2018.01)
*H04W 88/06* (2009.01)

(52) U.S. Cl.
CPC ........... *H04W 76/14* (2018.02); *H04W 76/27* (2018.02); *H04W 88/06* (2013.01)

(56) References Cited

U.S. PATENT DOCUMENTS

| | | | | |
|---|---|---|---|---|
| 2015/0043448 | A1* | 2/2015 | Chatterjee | H04W 8/005 370/329 |
| 2015/0087297 | A1* | 3/2015 | Hakola | H04W 48/14 455/426.1 |
| 2015/0117375 | A1* | 4/2015 | Sartori | H04W 56/001 370/329 |
| 2015/0120934 | A1* | 4/2015 | Wei | H04L 47/70 709/226 |
| 2015/0358907 | A1* | 12/2015 | Berggren | H04W 52/0229 455/574 |
| 2016/0165563 | A1* | 6/2016 | Jang | H04W 76/14 370/328 |
| 2016/0234670 | A1* | 8/2016 | Zhang | H04W 8/005 |
| 2017/0105236 | A1* | 4/2017 | Chandramouli | H04W 76/10 |
| 2017/0215160 | A1* | 7/2017 | Lohr | H04W 56/002 |

FOREIGN PATENT DOCUMENTS

| | | |
|---|---|---|
| WO | 2014163372 | 10/2014 |
| WO | 2014168396 | 10/2014 |

OTHER PUBLICATIONS

LG Electronics Inc., "RRC states for D2D communication and discovery", R2-132491, 3GPP TSG-RAN WG2 #83, Aug. 2013, 3 pages.

3rd Generation Partnership Project, "Technical Specification Group Radio Access Network; Evolved Universal Terrestrial Radio Access (E-UTRA); User Equipment (UE) procedures in idle mode (Release 8)", 3GPP TS 36.304 V8.5.0, Mar. 2009, 30 pages.

* cited by examiner

METHOD FOR TRANSMITTING, BY TERMINAL, SYNCHRONIZATION SIGNAL FOR DEVICE-TO-DEVICE (D2D) OPERATION IN WIRELESS COMMUNICATION SYSTEM, AND TERMINAL USING METHOD

CROSS-REFERENCE TO RELATED APPLICATIONS

This application is the National Stage filing under 35 U.S.C. 371 of International Application No. PCT/KR2015/011720, filed on Nov. 3, 2015, which claims the benefit of U.S. Provisional Application No. 62/074,095, filed on Nov. 3, 2014, the contents of which are all hereby incorporated by reference herein in their entirety.

BACKGROUND OF THE INVENTION

Field of the Invention

The present invention relates to wireless communication and, more particularly, to a method for transmitting, by a terminal, a synchronization signal for a device-to-device (D2D) operation in a wireless communication system, and a terminal using the method.

Related Art

In an International Telecommunication Union Radio communication sector (ITU-R), a standardization of International Mobile Telecommunication (IMT)-Advanced being a next mobile communication system after a third generation has been performed. The IMT-Advanced is aimed at supporting an Internet Protocol (IP) based multi-media service with a data transmission rate of 1 Gbps in a stop and low speed moving state and a data transmission rate of 1 Gbps in a high speed moving state.

A 3rd Generation Partnership Project (3GPP) is preparing LTE-Advanced (LTE-A) being an improved one of Long Term Evolution (LTE) based on an OFDMA (Orthogonal Frequency Division Multiple Access)/SC-FDMA (Single Carrier-Frequency Division Multiple Access) transmission scheme as a system standard satisfying requirements of IMT-Advanced. The LTE-A is one important candidate for IMT-Advanced.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is based on a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, a D2D operation.

The D2D operation may be signal transmission/reception between adjacent devices to have various advantages. For example, a D2D terminal may perform data communication with a high transmission rate and low delay. Further, the D2D operation may distribute traffic converged in a base station. If the D2D terminal serves as a relay, the D2D terminal may serve to extend coverage of a base station.

Meanwhile, even in a D2D operation, transmission of a synchronization signal may be required. The synchronization signal may provide a reference point in transmission, reception, decoding, etc. of a signal according to the D2D operation.

When the terminal enters a RRC connected state from a radio resource control (RRC) idle state, in the conventional technology, all D2D related signal transmission in the RRC idle state are stopped and the D2D related signals are transmitted under control of the serving cell. According to this conventional technology, when a specific terminal transmits a synchronization signal (D2DSS) for D2D operation in the RRC idle state and enters into the RRC connected state, the specific terminal may not transmit the D2DSS until receiving a setting explicitly permitting transmission of D2DSS from the serving cell. Therefore, the transmission of the D2DSS is stopped, and as a result, other terminals performing the D2D operation by performing synchronization based on the D2DSS transmitted by the specific terminal may cause a problem of synchronization for the D2D operation.

SUMMARY OF THE INVENTION

Technical subject to be solved by the present invention is to provide a method for transmitting, by a terminal, a synchronization signal for a device-to-device (D2D) operation in a wireless communication system, and a terminal using the method.

In an aspect, a method for transmitting a synchronization signal for a device-to-device (D2D) operation by a user equipment (UE) in a wireless communication system is provided. The method comprises transmitting a D2D synchronization signal (D2DSS) for D2D operation in an radio resource control (RRC) idle state, entering an RRC connected state and transmitting the D2DSS after entering the RRC connected state if a certain condition is met.

A one-bit indicator indicating whether to be allowed to continue transmitting the D2DSS may be received from a network when entering the RRC connected state.

The one-bit indicator may be included in system information.

The UE may transmit the D2DSS in the RRC connected state until the UE enters the RRC connected state and then receives a setting of disabling or disconnecting transmission of the D2DSS from the network.

The UE may transmit the D2DSS in the RRC connected state until shorter time of a first time until the UE enters the RRC connected state and then receives a setting of disabling or disconnecting transmission of the D2DSS from the network, and a predetermined second time.

The UE may enter the RRC connected state, then transmits UE prose information to the network.

The UE prose information may include an indicator indicating that the UE has transmitted the D2DSS in the RRC idle state.

The indicator may be included in the UE prose information only when the UE prose information includes a field of requesting a transmission resource for a D2D communication.

The certain condition may be a condition under which a one-bit indicator is received from a network, indicating that it is allowed to continue to transmit the D2DSS when entering the RRC connected state, and a measured value of a reference signal received power (RSRP) of a primary cell of the UE is less than a preset RSRP threshold.

In another aspect, a user equipment (UE) is provided. The UE comprises a radio frequency (RF) unit configured to transmit and receive a radio signal and a processor operatively coupled to the RF unit, wherein the processor configured to: transmit a D2D synchronization signal (D2DSS) for D2D operation in an radio resource control (RRC) idle state, enter an RRC connected state, and transmit the D2DSS after entering the RRC connected state if a certain condition is met.

According to the present invention, when the terminal transmits D2DSS in the RRC idle state and then enters the RRC connected state, the D2DSS may be continuously transmitted for a predetermined period of time. Therefore, transmission interruption of the D2DSS may be prevented from occurring. As a result, it is possible to reduce the adverse effect on other terminals performing synchronization based on the D2DSS, thereby improving the performance of the D2D operation.

DESCRIPTION OF EXEMPLARY EMBODIMENTS

Figure 1:
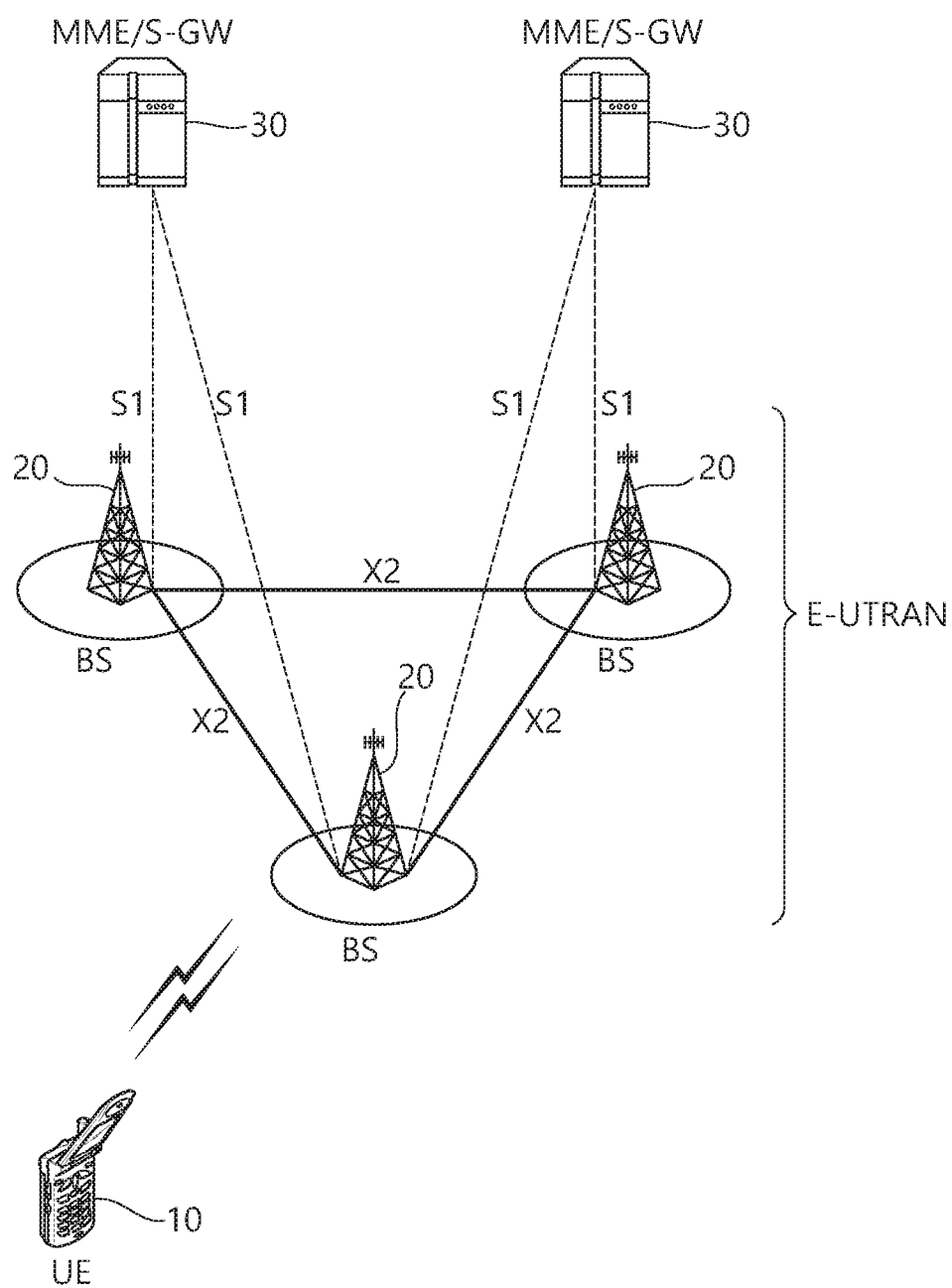
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
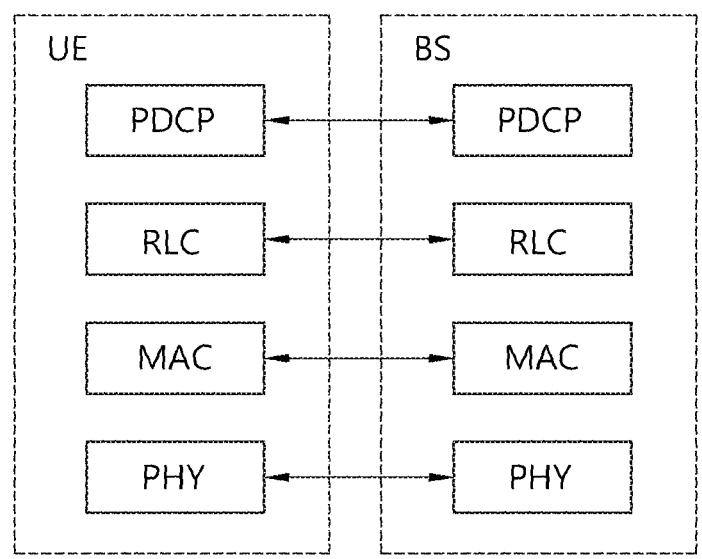
FIG. 2 is a diagram showing a wireless protocol architecture for a user plane.
Figure 3:
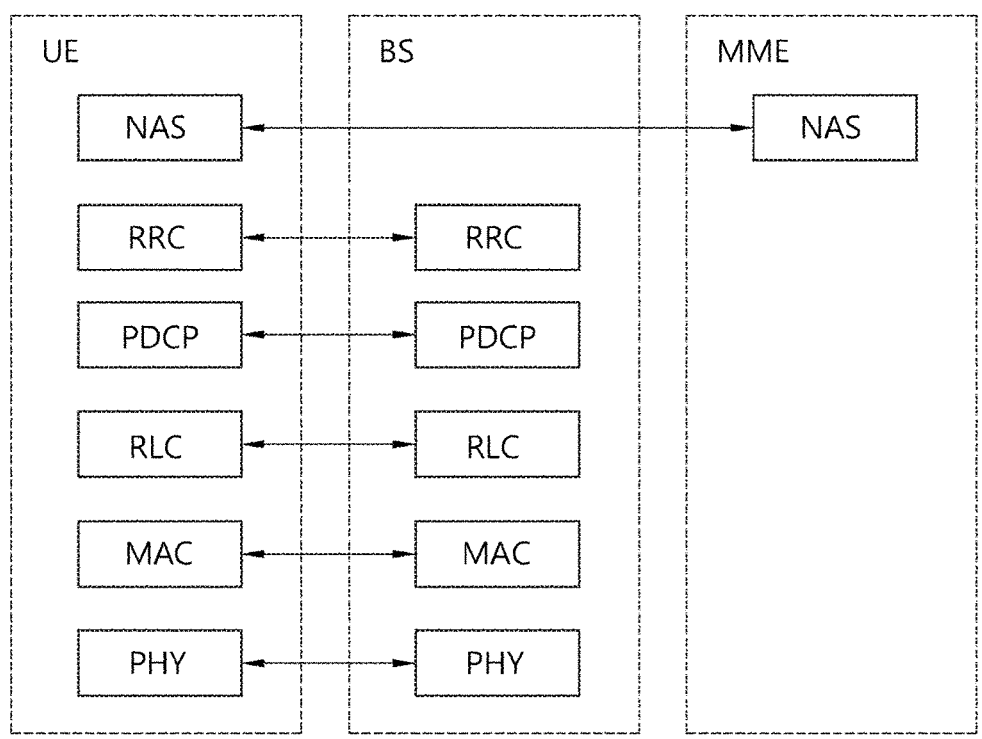
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes 51 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
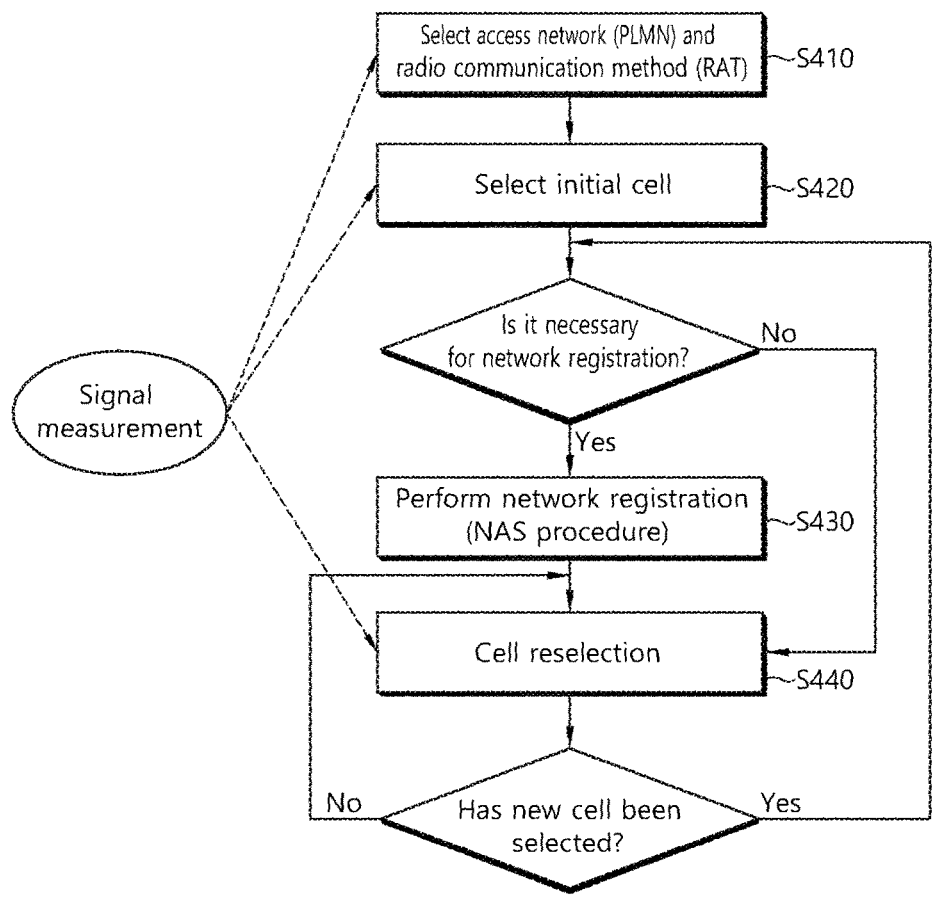
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
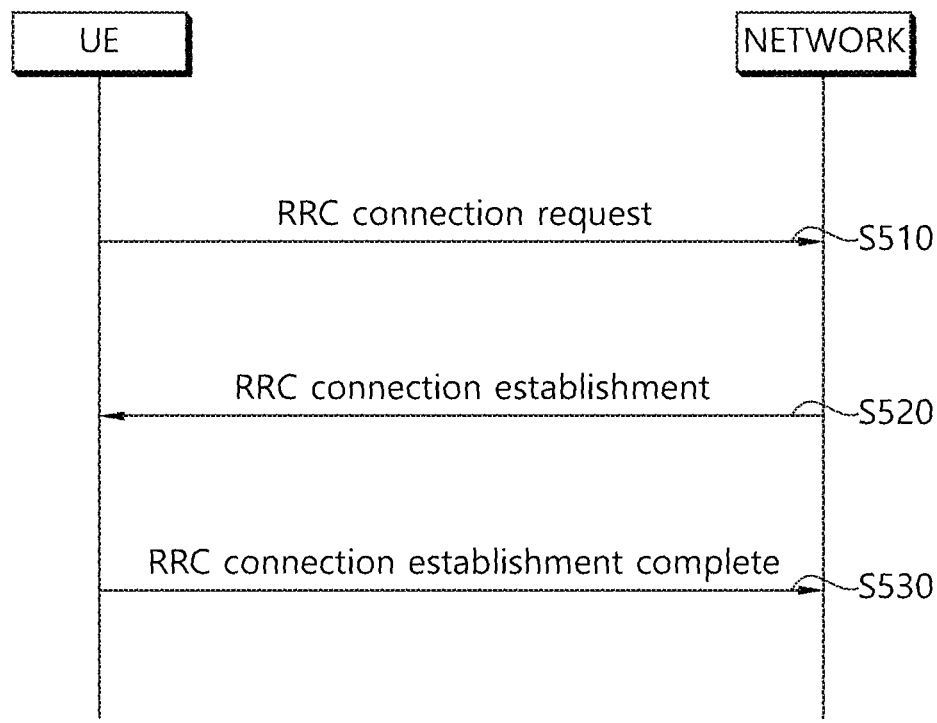
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
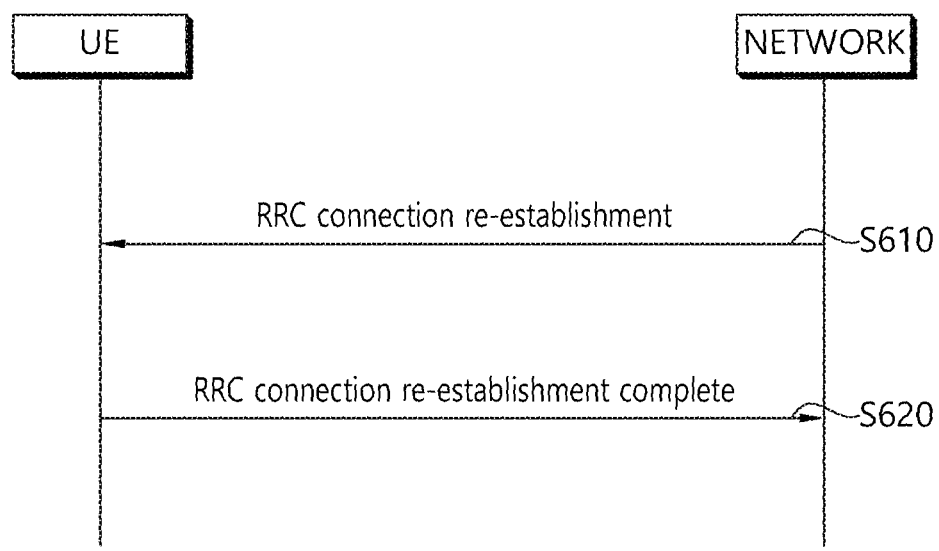
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC).

Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$Srxlev>0$ AND $Squal>0$, where:

$Srxlev = Q_{rxlevmeas} - (Q_{rxlevmin} + Q_{rxlevminoffset}) - P_{compensation}$, $Squal = Q_{qualmeas} - (Q_{qaulmin} + Q_{qualminoffset})$  [Equation 1]

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows. First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, \quad R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
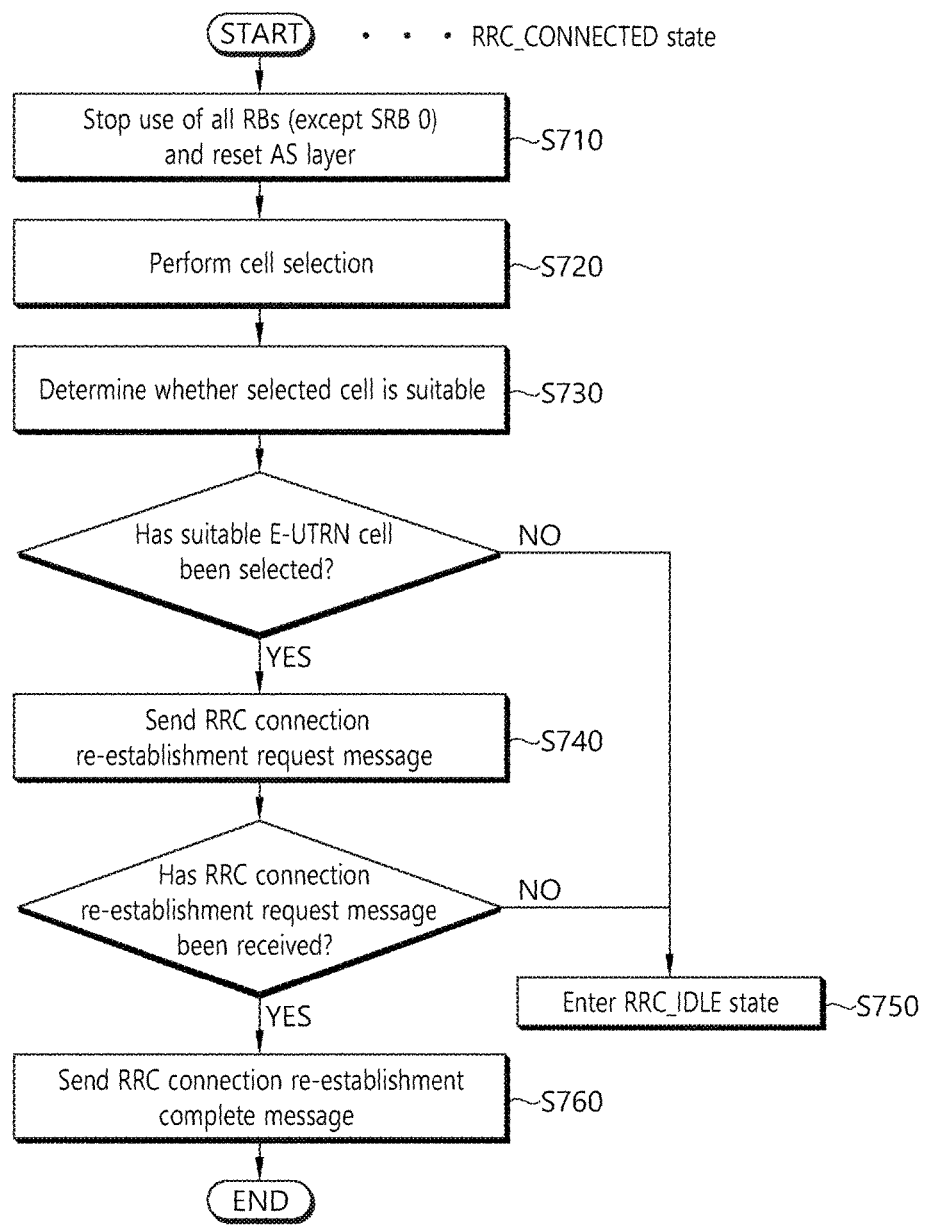
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
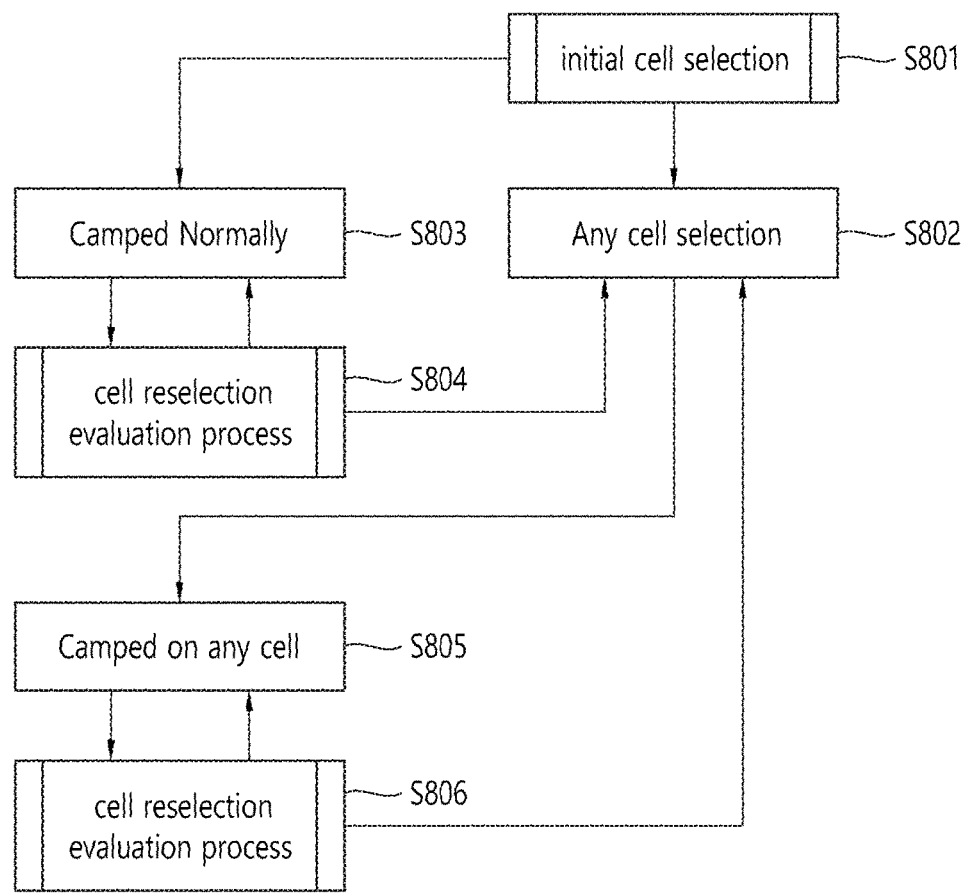
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
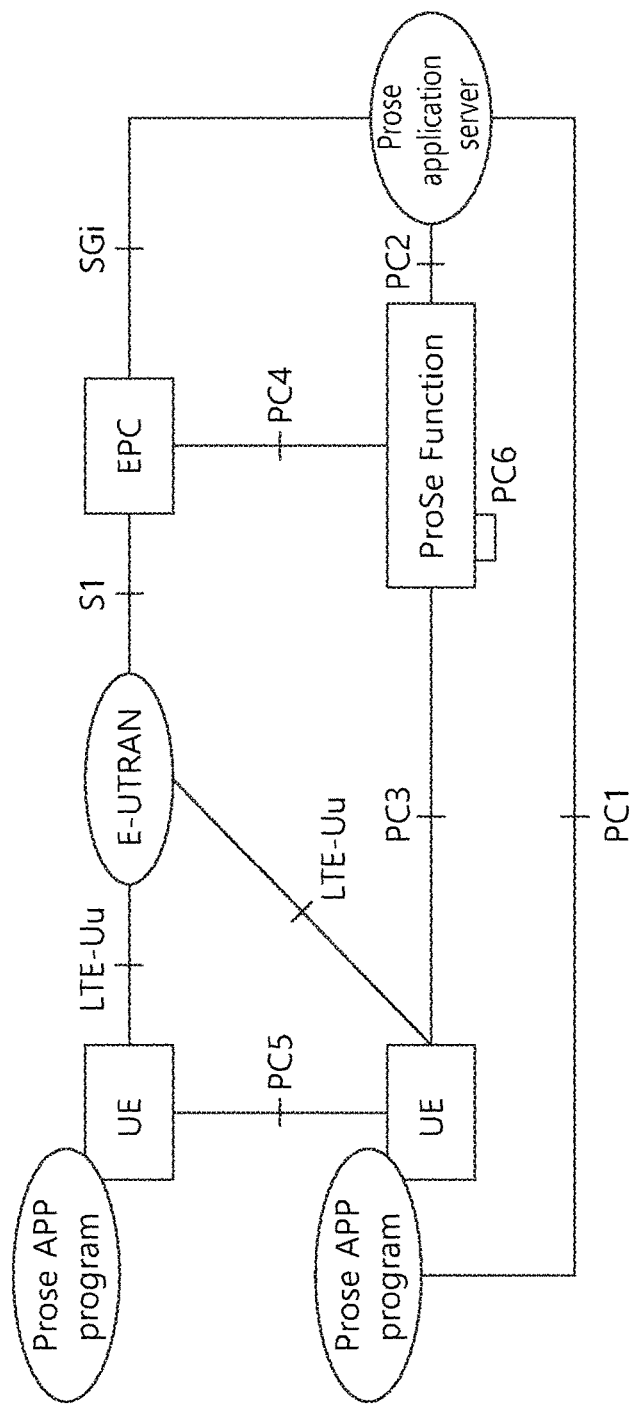
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
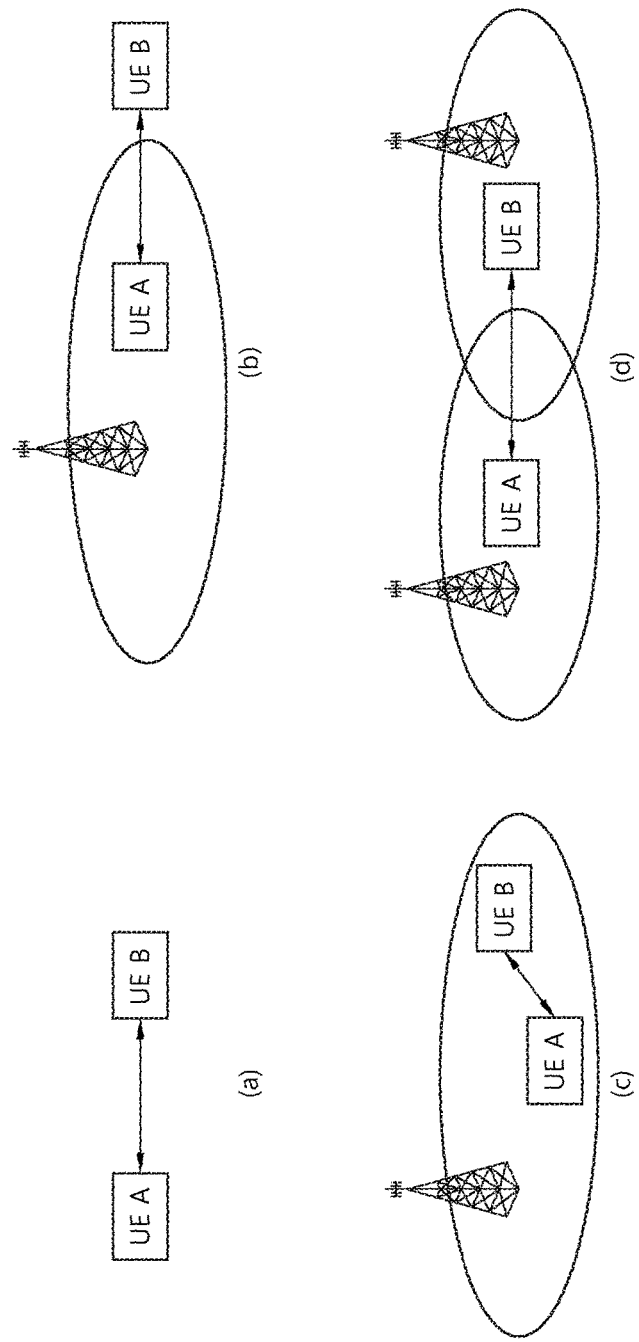
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
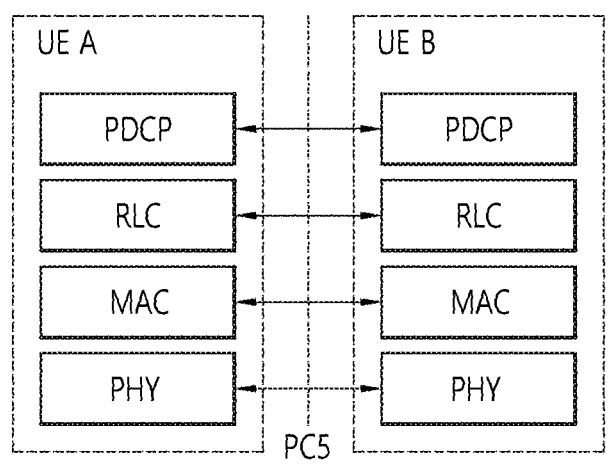
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
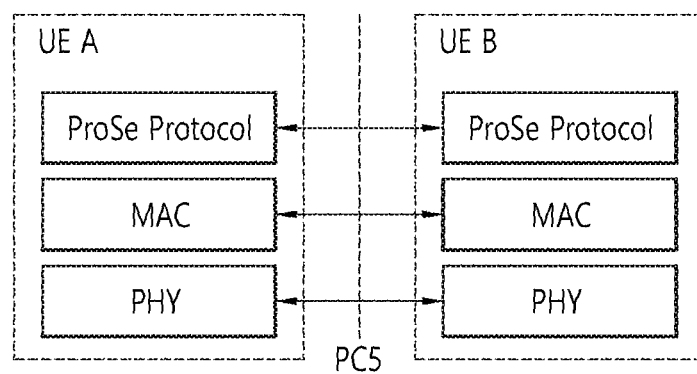
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Figure 13:
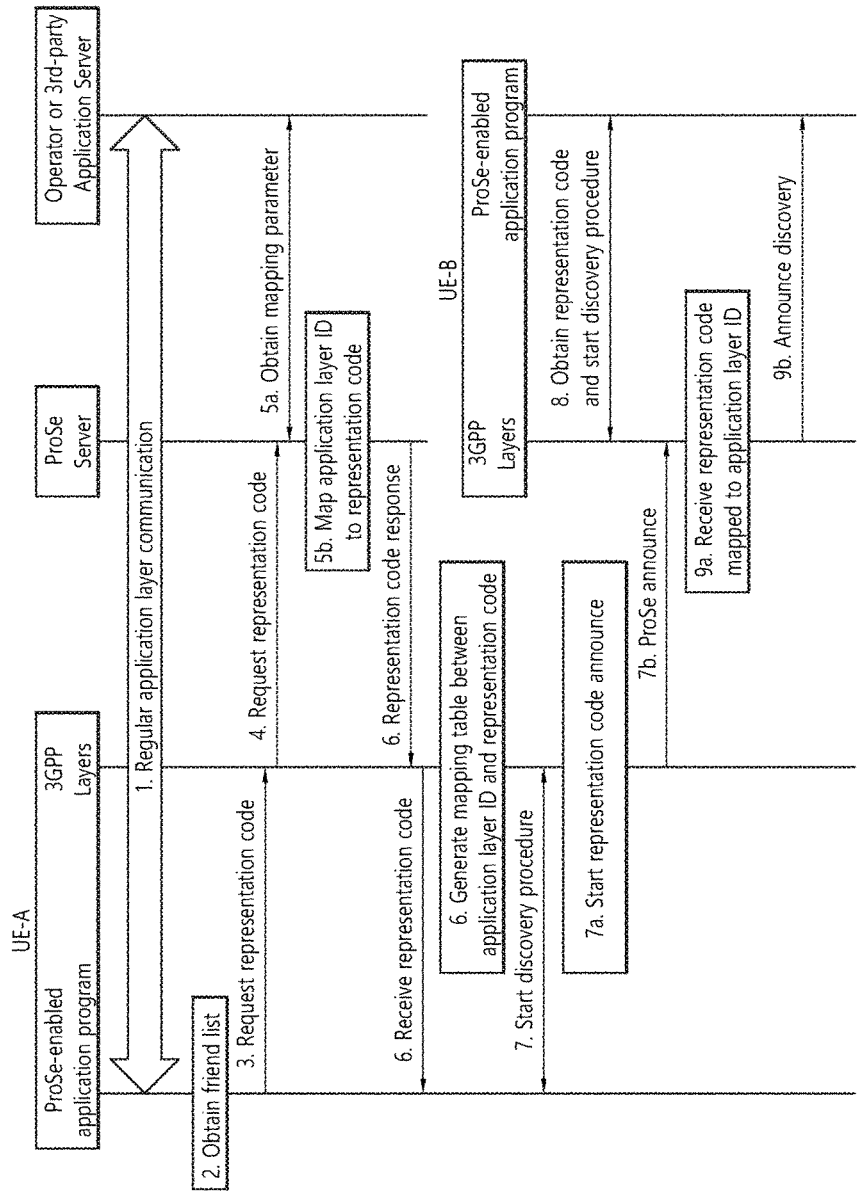
FIG. 13 illustrates an embodiment of a ProSe direct discovery procedure.

FIG. 13 illustrates an embodiment of a ProSe direct discovery procedure.

Referring to FIG. 13, it is assumed in a terminal A and a terminal B that a ProSe-enabled application program is operated, and the terminal A and the terminal B are configured in a friend relationship to each other, that is, a relationship capable of allowing D2D communication with each other in the application program. Hereinafter, the terminal B may be expressed as a friend of the terminal A. For example, the application program may be a social networking program. 3GPP Layers correspond to functions of an application program for using a ProSe discovery service regulated according to 3GPP.

A ProSe direct discovery between the terminal A and the terminal B may perform a following procedure.

1. First, the terminal A performs regular application-Layer communication with an application server. The above communication is performed based on Application programming interface (API).

2. A ProSe enabled application program of the terminal A receives a list of application layer IDs having a friend relationship. The application layer ID may generally be in the form of a network access ID. For example, an application layer ID of the terminal A may have a form such as adam@example.com.

3. A terminal A requests private expression codes for a user and private expression codes for a friend of the user.

4. 3GPP layers transmit an expression code request to a ProSe server.

5. The ProSe server map application layer IDs provided from an operator or a third application server to private expression codes. For example, an application layer ID such as adam@example.com. The mapping may be performed based on parameters (e.g., mapping algorithms, key values, and the like) received from an application service of the network.

6. The ProSe server responds the obtained expression codes to the 3GPP layers. The 3GPP layers report that expression codes with respect to the requested application layer are successively received to the ProSe enabled application program. Further, a mapping table between the application layer IDs and the expression codes are generated.

7. The ProSe enabled application program requests the 3GPP layers to start the discovery procedure. That is, when one of friends is located close to the terminal A and direct communication may be performed, the ProSe enabled application program attempts the discovery. 3GPP layers announce a private expression code of the terminal A (that is, "GTER543$#2FSJ67DFSF" which is a private expression code of adam@example.com in the above example). In mapping of an application layer ID of a corresponding application program and the private expression code, the mapping relationship may be known by the previously received friends, and the mapping may be performed.

8. It is assumed that the terminal B is operating the same ProSe enabled application program as that of the terminal A, and the above steps 3 to 6 may be executed. 3GPP layers included in the terminal B may perform ProSe discovery.

9. When the terminal B receives the above announce from the terminal A, the terminal B determines whether the private expression code included in the announce is known by the terminal B or is mapped to an application layer ID. As illustrated in step 8, since the terminal B performs steps 3 to 6, the terminal B knows a private expression code with respect to the terminal A, mapping of the private expression code to the application layer ID, and which is a corresponding application program. Accordingly, the terminal B may discover the terminal B from the announce of the terminal A. The 3GPP layers in the terminal B announces that adam@example.com is discovered to the ProSe enable application program.

FIG. 13 illustrates a discovery procedure by taking into consideration the terminals A and B, the ProSe server, and the application server. Only an operation side between the terminals A and B is described. The terminal A transmits a signal called the announce (the procedure may refer to announcement), and the terminal B receives the announce to discover the terminal A. That is, a discovery procedure of FIG. 13 in an operation directly related to another terminal among operations performed by each terminal may refer to a single step discovery procedure may refer to a single step discovery procedure in a side of one step.

Figure 14:
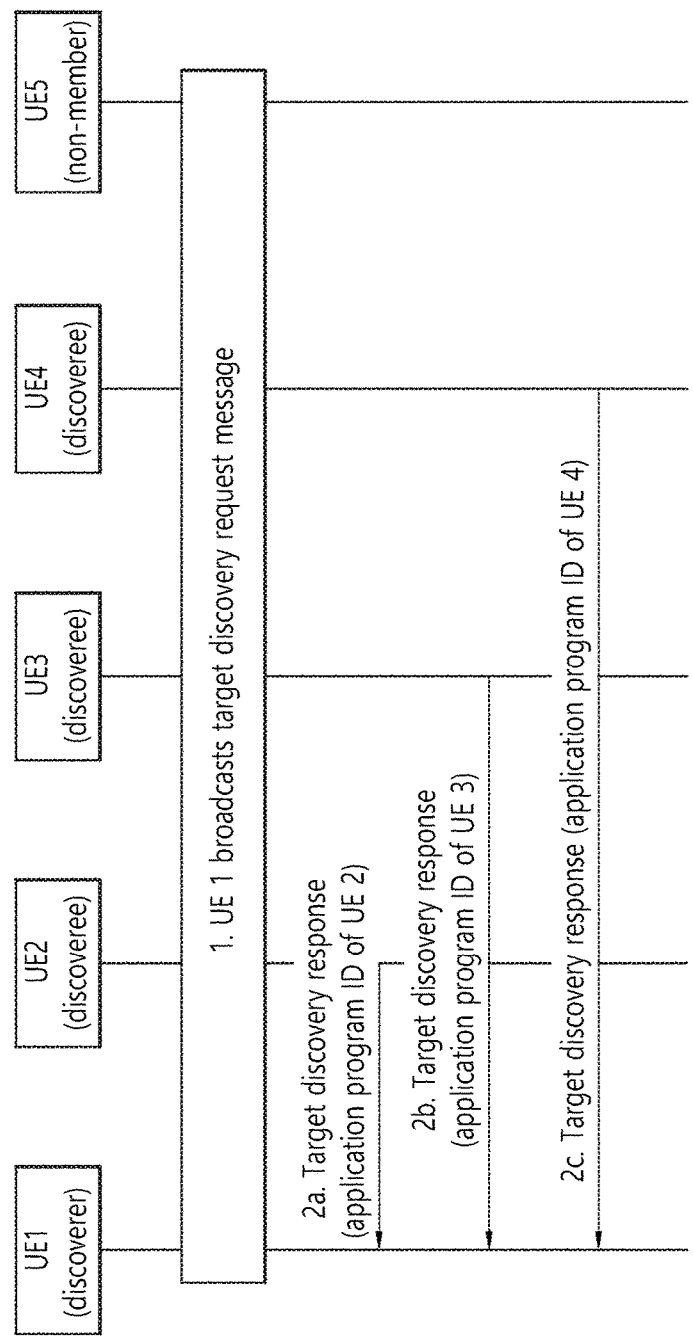
FIG. 14 illustrates another embodiment of a ProSe direct discovery procedure.

FIG. 14 illustrates another embodiment of a ProSe direct discovery procedure.

In FIG. 14, it is assumed that the terminal 1 to the terminal 4 may be included in a specific group communication system enablers (GCSE) group. It is assumed that the terminal 1 is a discoverer and terminals 2, 3, and 4 are a discoveree. A terminal 5 is a terminal regardless of a discovery procedure.

The terminal 1 and the terminals 2 to 4 may perform a following operation in a discovery procedure.

First, the terminal 1 broadcasts a targeted discovery request message (hereinafter referred to 'discovery request message' or 'M1') in order to discover whether an optional terminal included in the GCSE group is located around the terminal 1. The targeted discovery request message may include a unique application program group ID or a layer-2 group ID of the specific GCSE group. Further, the targeted discovery request message may include a unique ID of the terminal 1, that is, an application program private ID. The targeted discovery request message may be received by the terminals.

The terminal 5 transmits no response messages. The terminals 2, 3, and 4 included in the GCSE group transmit a targeted discovery response message (hereinafter referred to as a discovery response message or M2) as a response to the targeted discovery request message. The targeted discovery response message may include a unique application program private ID of a terminal transmitting the message.

An operation of terminals in a ProSe discovery procedure illustrated in FIG. 14 will be described. A discoverer (UE 1) transmits the targeted discovery request message, and receives a targeted discovery response message being a response thereto. In addition, if a discoveree (e.g., UE 2) receives the targeted discovery request message, the discoveree transmits a targeted discovery response message as a response thereto. Accordingly, each terminal performs an operation a second step. In the above side, a ProSe discovery procedure of FIG. 14 may refer to a discovery procedure.

In addition to the discovery procedure illustrated in FIG. 14, if the terminal 1 (discoverer) transmits a discovery confirm message (hereinafter may refer to M3) as a response to the targeted discovery response message, this may refer to a third step discovery procedure.

The present invention will now be described.

The terminal may transmit a synchronization signal when performing a D2D operation such as D2D discovery or D2D communication. The synchronization signal may provide a reference for synchronization of signals transmitted and received according to the D2D operation. Hereinafter, the synchronization signal of the D2D operation may be referred to as a D2D synchronization signal or D2DSS.

The network (E-UTRAN) may be configured to serve as a source of synchronization signals for terminals that are in the RRC connected state. That is, it may be set to transmit the D2D synchronization signal. In this case, the network may transmit the D2D synchronization signal irrespective of the RSRP value measured by the terminal, or may transmit the D2D synchronization signal only when the RSRP value measured by the terminal is lower than a broadcasted RSRP threshold.

Figure 15:
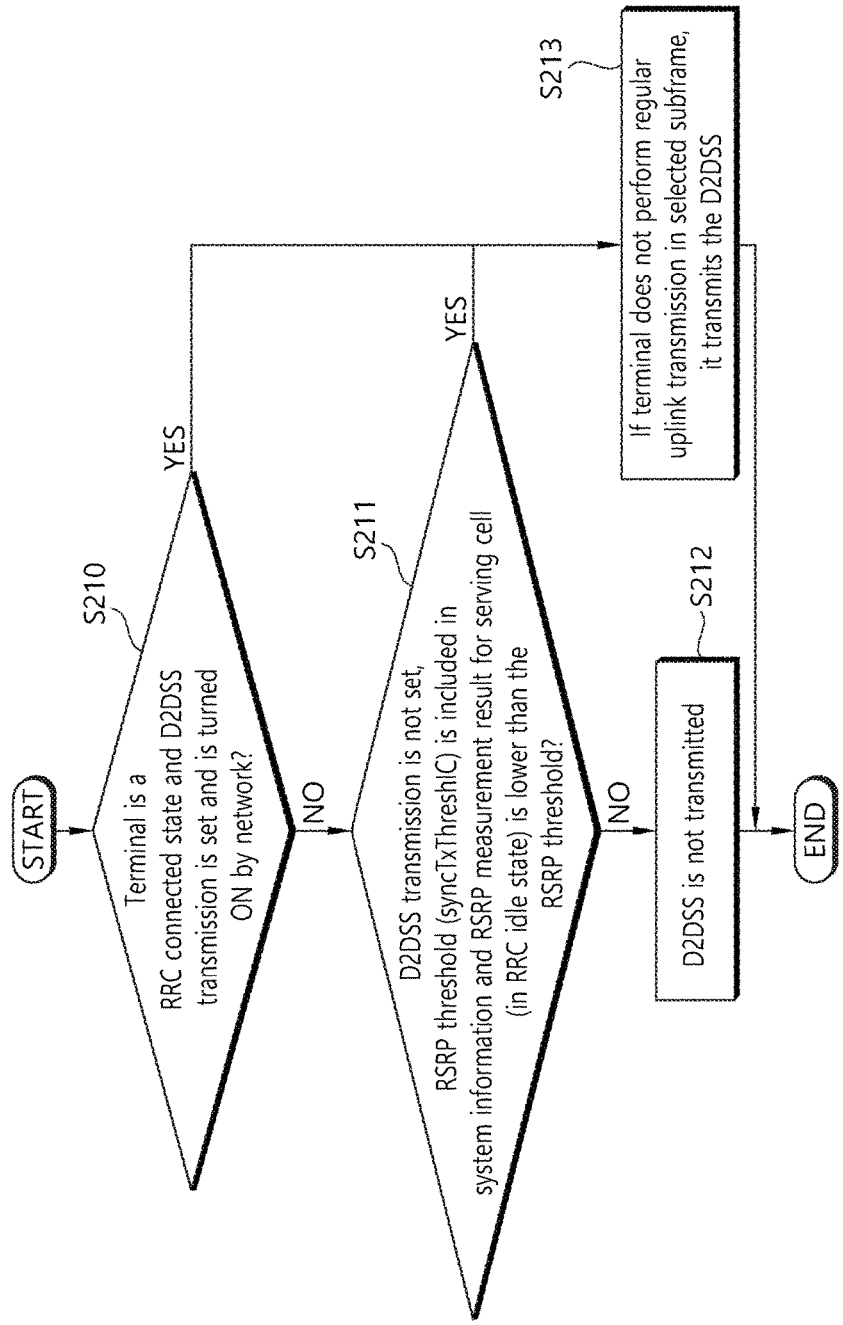
FIG. 15 shows an example of the D2D synchronization signal transmission of the terminal.

FIG. 15 shows an example of the D2D synchronization signal transmission of the terminal.

It is assumed that the terminal is capable of transmitting a D2D synchronization signal when performing D2D discovery (more specifically, D2D discovery announcement) or D2D communication.

Referring to FIG. 15, the terminal determines whether it is the RRC connected state and the D2DSS transmission is set and is turned ON by the network (S210). The network may directly control the D2DSS transmission of the terminal by ON/OFF method. The setting for this control is called 'networkControlledSyncTx'. In this case, the terminal may determine whether the 'networkControlledSyncTx' is set and the value is set to a value indicating ON.

As a result of the determination, when the D2DSS transmission is set by the network and the D2SSS transmission is turned ON by the setting, the terminal may transmit the D2DSS. In this case, the terminal sets resources (subframes) capable of transmitting D2DSS and may transmit D2DSS in a selected subframe among the subframes. The selected subframe may be a subframe that is not used by the terminal for regular uplink transmission, that is, for signal transmission of the terminal by cellular communication. That is, if the terminal does not perform the regular uplink transmission in the selected subframe, it transmits the D2DSS in the selected subframe (S213). If the selected subframe is used for signal transmission by cellular communication, the D2DSS is not transmitted in the selected subframe.

Meanwhile, the terminal determines whether the setting of the D2DSS transmission ('networkControlledSyncTx') is not set by the network, the RSRP threshold is included in the system information, and the RSRP measurement result for the serving cell (in the RRC idle state) is lower than the RSRP threshold (S211).

In the determining step, if the setting for the D2DSS transmission is not set and the RSRP measurement value is lower than the RSRP threshold, if the selected subframe is not used for regular uplink transmission, the terminal transmits D2DSS to the selected subframe (S213). If not, the D2DSS is not transmitted (S212).

That is, for the terminal in the RRC connected state, whether to transmit the D2DSS is determined based on ON/OFF setting by the network, and the terminal in the RRC idle state compares the RSRP threshold provided by the system information with the RSRP measurement value of the serving cell and transmits the D2DSS when the RSRP measurement value is lower than the RSRP threshold.

However, this method assumes that the frequency at which the D2D operation is performed and the frequency at which the terminal maintains the RRC connected state are equal to each other.

If the terminal performs the D2D operation at a second frequency, which is not a first frequency while the terminal is in the RRC connected state in the cell of the first frequency, it may be difficult to apply the method of FIG. 15 in the same manner. According to the method of FIG. 15, if the cell of the first frequency does not explicitly instruct the terminal to start transmitting the D2D synchronization signal, the D2DSS transmission the second frequency will not be possible.

In order to solve such a problem, the present invention proposes that allows a terminal in an RRC connected state for a first cell of a first frequency to transmit D2DSS in a second cell when the RSRP measurement value for second cell of the second frequency on which the D2D operation is performed is lower than the configured RSRP threshold even if there is no explicit D2DSS transmission instruction.

Figure 16:
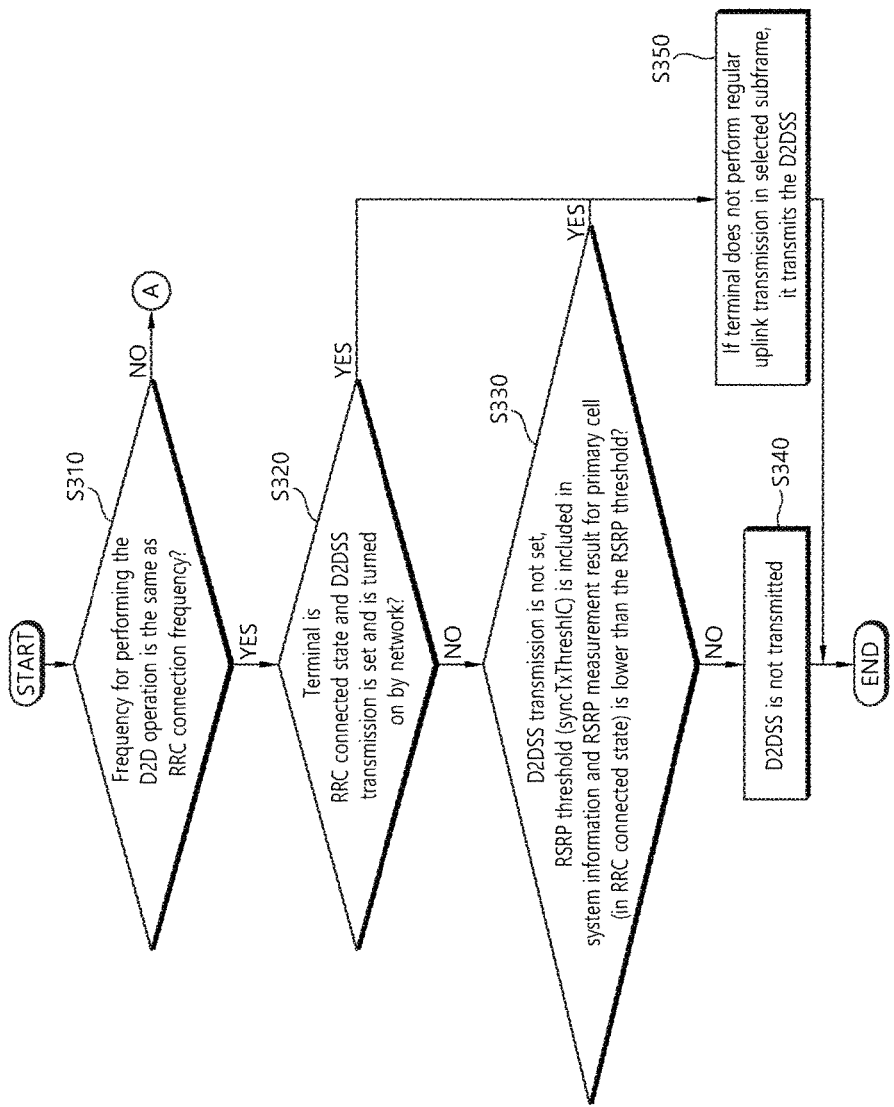
FIG. 16 illustrates the D2DSS transmission method of a terminal according to an embodiment of the present invention.
Figure 17:
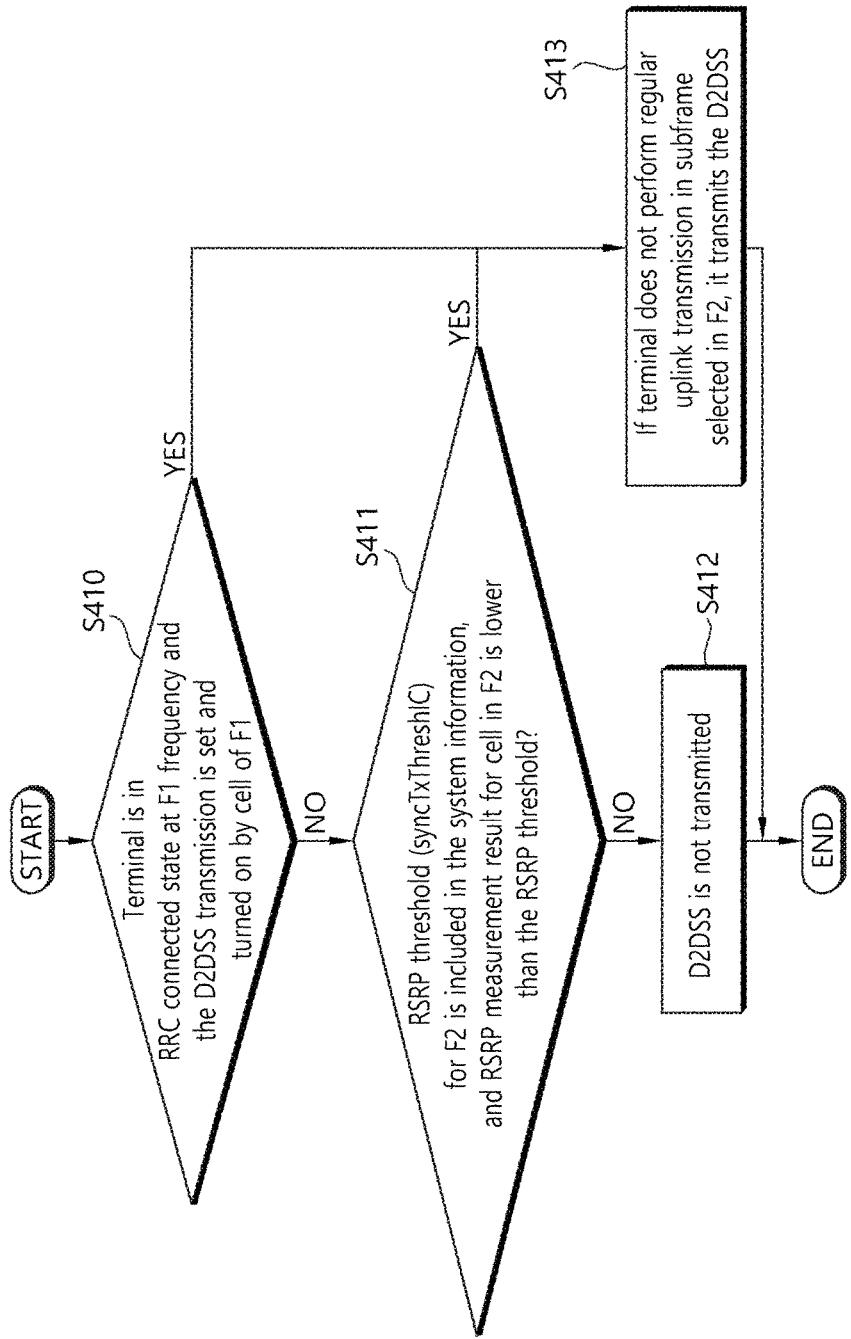
FIG. 17 illustrates a method of transmitting the D2DSS of a terminal according to another embodiment of the present invention.

Hereinafter, a method of a transmitting the D2DSS by the terminal according to the present invention will be described, FIG. 16 is a diagram illustrating a method in which a serving frequency for maintaining a RRC connected state is the same as a D2D frequency for performing a D2D operation, and FIG. 17 is a method when the serving frequency and the D2D frequency is different from each other. FIGS. 16 and 17 may be performed by the same terminal according to the corresponding situation.

FIG. 16 illustrates the D2DSS transmission method of a terminal according to an embodiment of the present invention.

Referring to FIG. 16, the terminal determines whether the frequency for performing the D2D operation and the RRC connection frequency are the same (S310).

The terminal determines whether it is RRC connected state and the D2DSS transmission is set and is turned on by the network (S320). The network may directly control the D2DSS transmission of the terminal. The setting for the control of the D2DSS transmission is referred to 'networkControlledSyncTx'. In this case, the terminal may determine whether the 'networkControlledSyncTx' is set and its value is set to 'on'.

As a result of the determination, if the D2DSS transmission is set by the network and the selected subframe is not used for the regular uplink transmission, the D2DSS is transmitted in the selected subframe (S350). That is, the D2DSS is transmitted in the selected subframe only when the selected subframe is not used for cellular communication.

Meanwhile, if the D2DSS transmission is not established and the RSRP threshold is included in the system information and the result of the RSRP measurement for the serving cell (in the RRC idle state) or the primary cell (in the RRC connected state) is lower than the RSRP threshold (S330).

The following table illustrates system information including the RSRP threshold.

TABLE 2

SystemInformationBlockType19 information element

```
-- ASN1START
SystemInformationBlockType19-r12 ::= SEQUENCE {
    discConfig-r12                          SEQUENCE {
        discRxPool-r12                      SL-DiscRxPoolList-r12,
        discTxPoolCommon-r12                SL-DiscTxPoolList-r12
                                            OPTIONAL,   -- Need
OR
        discTxPowerInfo-r12                 SL-DiscTxPowerInfoList-r12
                                            OPTIONAL,   -- Cond Tx
        discSyncConfig-r12                  SL-SyncConfigList-r12
                                            OPTIONAL     -- Need OR
    }
                                            OPTIONAL,   -- Need
OR
    discInterFreqList-r12                   SL-CarrierFreqInfoList-r12
                                            OPTIONAL,   -- Need
OR
    lateNonCriticalExtension        OCTET STRING
                                            OPTIONAL,
    ...
}
SL-CarrierFreqInfoList-r12 ::=    SEQUENCE (SIZE (1..maxFreq)) OF SL-CarrierFreqInfo-r12
SL-CarrrerFreqInfo-r12::=         SEQUENCE {
    carrierFreq-r12                         ARFCN-ValueEUTRA-r9,
    plmn-IdentrtyList-r12                   PLMN-IdentityList4-r12
                                            OPTIONAL      -- Need OP
}
PLMN-IdentityList4-r12 ::= SEQUENCE (SIZE (1..maxPLMN-r11)) OF    PLMN-IdentityInfo2-r12
PLMN-IdentityInfo2-r12 ::=        CHOICE {
    plmn-Index-r12                          INTEGER (1..maxPLMN-r11),
    plmnIdentity-r12                        PLMN-Identity
}
-- ASN1STOP
```

In the table 2, 'discConfig' indicates a setting for D2D discovery, 'discRxPool' indicates a reception resource for the D2D discovery, 'discTxPoolCommon' indicates a transmission resource for the D2D discovery, and 'discSyncConfig' indicates the settings allowed to send or receive synchronization information for the discovery. 'DiscSyncConfig' includes 'SL-SyncConfigList', and 'SL-SyncConfigList' is as follows.

TABLE 3

SL-SyncConfig information element

```
-- ASN1START
SL-SyncConfigList-r12 ::=    SEQUENCE (SIZE (1..maxSL-SyncConfig-r12))
OF SL-SyncConfig-r12
SL-SyncConfig-r12 ::=                       SEQUENCE {
    syncCP-Len-r12                          SL-CP-Len-r12,
    syncOffsetIndicator-r12                 SL-OffsetIndicatorSync-r12,
    slssid-r12                              SLSSID-r12,
    txParameters-r12                        SEQUENCE {
        syncTxParameters-r12                    SL-TxParameters-r12,
        syncTxThreshIC-r12                      RSRP-RangeSL-r12,
        syncInfoReserved-r12                    BIT STRING (SIZE (19))
                                                OPTIONAL    -- Need OR
    }
                                            OPTIONAL,   -- Need OR
    rxParamsNCell-r12                       SEQUENCE {
        physCellId-r12                          PhysCellId,
        discSyncWindow-r12                      ENUMERATED {w1, w2}
    }                                       OPTIONAL,   -- Need OR
    ...
}
-- ASN1STOP
```

In Table 3, 'syncOffsetIndicator' is an offset value for indicating a resource capable of transmitting D2DSS, and 'txParameters' indicates parameters necessary for transmitting D2DSS. Among them, 'syncTxThreshIC' represents the RSRP threshold for D2DSS transmission.

The terminal is to transmit D2DSS when the RSRP value measured for the selected cell for transmission of the D2D signal according to the D2D communication/D2D discovery is lower than the RSRP threshold provided by the 'syncTxThreshIC'.

In the determination step, if the D2DSS transmission is not set and the RSRP measurement value is lower than the RSRP threshold, the terminal transmits the D2DSS in the selected subframe if the selected subframe is not used for regular uplink transmission (S350). That is, even if the D2DSS transmission is not configured by the network, the terminal in the RRC connected state may transmit the D2DSS if the RSRP measurement value for the primary cell is lower than the RSRP threshold. Otherwise, the D2DSS is not transmitted (S340).

The method described with reference to FIG. 16 will be described again in the following.

For a terminal within the network coverage, up to one D2D synchronization signal resource may be set for the carrier (frequency) performing D2D operation. The D21) synchronization signal resource refers to a resource capable of transmitting the D2DSS, and may be composed of periodic subframes. The terminal may transmit D2DSS in a subframe satisfying a certain condition among the periodic subframes. The base station may reutilize resources not used for D2D synchronization signal.

The periodicity of the subframe in which that the D2DSS may be transmitted, may be the same within the network coverage or outside the network coverage, for example, the period it may be 40 milliseconds (ms).

The D2D synchronization signal resource may be set to an offset value that makes one subframe a granularity. The 'syncOffsetIndicator' in Table 3 corresponds to the offset.

The offset value for the D2D synchronization signaling resource of the neighboring cell may be signaled via the system information. For example, it is possible to inform, through an offset value, how many subframes are spaced apart from the system frame number (SFN) 0 of the serving cell.

The scheduling assignment (SA) according to the D2D operation or the terminal transmitting the D2D data may transmit the D21) synchronization signal in each subframe of the D2D synchronization signal resource on the carrier that performs the D2D operation when the following condition is met.

A terminal in the RRC idle state may transmit the D2DSS when the following conditions are satisfied.

1) An RSRP threshold is set for transmitting the D2D synchronization signal (the RSRP threshold may be set via system information, for example, the RSRP threshold is {−infinity, −115, −110, −60, +Infinity} dBm, in units of 5 dBm.

2) The RSRP value measured by the terminal should be smaller than the RSRP threshold.

In addition, the terminal may additionally consider the following conditions for D2DSS transmission.

3) Corresponding subframe in which the D2DSS is to be transmitted in the terminal should not collide with the transmission according to the cellular communication, and 4) other conditions including terminal capability should be satisfied. 5) The corresponding subframe should be a subframe corresponding to a scheduling assignment (SA) according to the D2D operation or a period for transmitting D2D data.

A terminal in RRC connected state may transmit the D2DSS when the following conditions are satisfied. When the terminal is in the RRC connected state in the cell of the carrier (frequency) on which the D2D operation is performed, that is, when the serving frequency of the terminal is the same as the D2D operating frequency.

1) The network should instruct the terminal to start the D2DSS transmission through the dedicated signal. Further/in addition, 2) if the RSRP threshold for the D2D synchronization signal transmission is set and the RSRP value measured by the terminal is lower than the RSRP threshold, the D2DSS may be transmitted. The terminal may additionally consider the following conditions.

3) Corresponding subframe in which the D2DSS is to be transmitted in the terminal should not collide with the transmission according to the cellular communication, and 4) other conditions including the terminal capability should be satisfied. 5) The corresponding subframe must be a subframe corresponding to a scheduling assignment (SA) or a period for transmitting the D2D data.

Now, the D2DSS transmission method of the terminal will be described when the frequency for performing the D2D operation and the RRC connection frequency are different from each other.

FIG. 17 illustrates a method of transmitting the D2DSS of a terminal according to another embodiment of the present invention.

It is assumed that the terminal may establish an RRC connection with a cell at F1 frequency and perform the D2D operation (D2D discovery or D2D communication) the F2 frequency.

Referring to FIG. 17, in step S410, the terminal determines whether it is in the RRC connected state at the F1 frequency and the D2DSS transmission is set and turned on by the cell of F1. That is, the cell of F1 may provide the terminal with the setting for the D2D operation at F2 and may control the D2DSS transmission.

As a result of the determination, if D2DSS transmission at F2 is set by the cell of F1, and the selected subframe at F2 is not used for regular uplink transmission, the D2DSS is transmitted in the selected subframe (S413).

Meanwhile, even if the D2DSS transmission in F2 is not set (S411), the terminal determines whether the RSRP threshold for F2 is included in the system information and the RSRP measurement result for the cell in F2 is lower than the RSRP threshold.

If the D2DSS transmission in F2 is not set and the RSRP measurement value for the cell of F2 is lower than the RSRP threshold in the determination step S411, the terminal transmits the D2DSS in the selected subframe if the subframe selected in F2 is not used in the regular uplink transmission (S413), That is, even if the D2DSS transmission is not configured by the network, the terminal in the RRC connected state may transmit the D2DSS when the RSRP measurement value of the cell of F2 is less than the RSRP threshold.

If not, the D2DSS is not transmitted (S412). For example, if the RSRP measurement for the cell of F2 is higher than the RSRP threshold, the D2DSS is not transmitted.

The method of FIG. 17 will be described again as follows,

The terminal may be in an RRC connected state with a cell at a frequency other than the frequency at which the terminal performs the D2D operation. That is, there is a case where the serving frequency of the terminal in the RRC connected state differs from the frequency of performing the D2D operation. In this case, the terminal needs to allow transmission of the D2D synchronization signal based on the RSRP threshold even if there is no network instruction to command the D2D synchronization signal transmission via the dedicated signal.

A terminal in the RRC connected state may transmit the D2DSS if the following conditions are satisfied.

1) The RSRP threshold for the D2D synchronization signal transmission may be set (the RSRP threshold may be set via the system information). The RSRP threshold may be set as {−infinity, −115, −110, . . . , −60, +infinity} dBm. 2) The RSRP value of the terminal should be smaller than the RSRP threshold.

In addition, the terminal may additionally consider the following conditions.

3) The corresponding subframe used for the D2DSS transmission should not collide with the transmission according to the cellular communication, and 4) other conditions including the terminal capability should be satisfied. 5) The corresponding subframe should be a subframe corresponding to a scheduling assignment (SA) according to the D2D operation or a subframe corresponding to a period for transmitting D2D data.

For each D2D discovery resource pool configured for D2D discovery, the terminal may transmit the D2DSS in the first subframe of the D2D discovery resource pool. For example, the first subframe constituting the D2D discovery resource pool may be included in the D2D synchronization signal resource, in which case the D2DSS may be transmitted in the first subframe. Otherwise, the D2DSS may be transmitted in the most recent subframe before the start of the D2D discovery resource pool.

If a subframe for D2DSS transmission does not collide with a transmission according to cellular communication in the terminal, the terminal does not scan another D2D synchronization signal and may be a subframe satisfying other conditions including terminal capability.

If the terminal does not detect any cell that satisfies the S-criterion of Equation 1, the terminal may determine that it is out of network coverage. A terminal outside the network coverage may use two D2D synchronization signaling resources. The D2D synchronization signal resources may be preset or signaled by the network, or may be a fixed resource.

Meanwhile, according to the method of FIG. 15, when a specific terminal that has transmitted D2DSS in the RRC idle state enters the RRC connected state, there is a problem that the D2DSS transmission should be stopped until the network explicitly allows the D2DSS to be transmitted. That is, the D2DSS transmission is set by the network for the specific terminal, and the D2SSS transmission is turned on by the setting, and thus the specific terminal may transmit the D2DSS in the RRC connected state. If the D2DSS transmission is stopped until the specific terminal receives the setting for the D2DSS transmission, other terminals operating in synchronization with the D2DSS of the terminal increase error occurrence probability.

Also, the network may not know whether the terminal entering the RRC connected state has previously transmitted the D2DSS. The base station may not know the specific terminal that is transmitting the D2DSS among the terminals entering the RRC connected state and may not assign a priority to the D2DSS resource allocation of the specific terminal. Therefore, the D2DSS transmission disconnection may be prolonged, which degrades the performance of the D2D operation.

Therefore, in the present invention, when a terminal that has transmitted D2DSS in the RRC idle state enters the RRC connected state, the following methods may be applied.

<Method 1>

Figure 18:
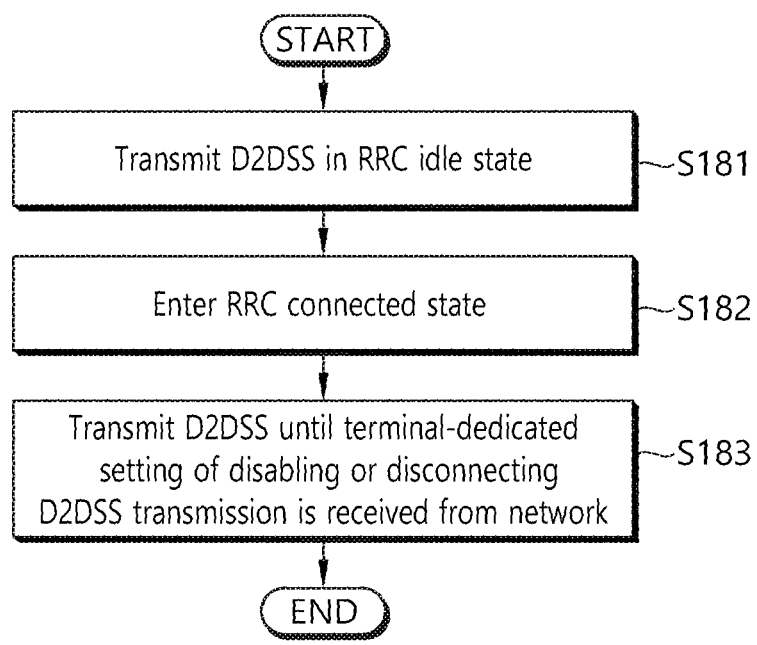
FIG. 18 shows a method of transmitting the D2DSS of a terminal according to an embodiment of the present invention.

FIG. 18 shows a method of transmitting the D2DSS of a terminal according to an embodiment of the present invention.

Referring to FIG. 18, the terminal transmits a D2DSS in the RRC idle state (S181). The terminal enters the RRC connected state (S182). Even if the terminal enters the RRC connected state, the terminal continuously performs the D2DSS transmission until the D2DSS transmission is disabled or disconnected by the terminal dedicated setting by the network (S183).

That is, when the terminal satisfies a certain condition, the terminal may continuously transmit the D2DSS transmitted in the RRC idle state for a certain period of time even in the RRC connected state. In FIG. 18, an example of the certain condition may be described as not receiving the terminal dedicated setting of disabling or disconnecting the D2D transmission by the network.

The network may inform the terminal whether or not it is allowed to continue transmitting the D2DSS when the terminal that has transmitted the D2DSS in the RRC idle state enters the RRC connected state. For example, the terminal may indicate whether the D2DSS transmission is continued through the system information as shown in the following table.

TABLE 4

```
-- ASN1START
SystemInformationBlockType18-r12 ::= SEQUENCE {
    -- Presence of SIB18 indicates that UE is allowed to provide interest indication
    -- I.e. SIB18 may be provided merely for this purpose (and thus be empty)
    commConfig-r12                              SEQUENCE {
        commGeneralConfig-r12    ProseCommGeneralConfig-r12    OPTIONAL,--    Need
OR
        -- TBC whether general configuration parameters are common across the
different pools
        commRxPool-r12           ProseCommPoolList16-r12,
        commTxPoolNormalCommon-r12   ProseCommPoolList4-r12    OPTIONAL,--    Need
OR
        commTxPoolExceptional-r12    ProseCommPoolList4-r12    OPTIONAL --    Need
OR
    }
                                                OPTIONAL,     -- Need OR
    lateNonCriticalExtension                    OCTET STRING  OPTIONAL,
    SLSSContinuationFlag                        1 bit
    ...
}
-- ASN1STOP
```

In Table 4, 'CommRxPool' indicates resources for which the terminal is allowed to receive signals according to D2D communication. 'CommTxPoolNormalCommon' indicates a resource to which signal transmission according to D2D communication is allowed in the RRC idle state. 'CommTx-PoolExceptional' indicates a resource that is allowed to transmit signals according to D2D communication when exceptional conditions are met in the RRC connected state. 'SLSSContinuationFlag' is a field for informing the terminal whether or not it is allowed to continue transmitting D2DSS when the terminal has transmitted D2DSS in the RRC idle state and enters the RRC connected state, and may be configured with one-bit.

If it is indicated by the network that the terminal that transmitted D2DSS in the RRC idle state enters the RRC connected state and that it is allowed to continue transmitting the D2DSS, for the terminal entering the RRC connected state, if 1) the D2DSS transmission is not configured by the network, 2) the RSRP threshold is included in the system information, and 3) if the RSRP measurement result for the primary cell is lower than the RSRP threshold, then the D2DSS may be transmitted.

If a terminal that has transmitted the D2DSS in the RRC idle state enters the RRC connected state and continuing to transmit the D2DSS is set, by the network, as being not permitted or disabling, then the terminal entering the RRC connected state transmits stops the D2DSS transmission <Method 2>

This method is a method for stopping the D2DSS transmission when the terminal that has transmitted D2DSS in the RRC idle state enters the RRC connected state. When initiating RRC connection establishment, the network may inform the terminal whether it is allowed to continue to perform the D2DSS transmission. For example, if the network initiates an RRC connection establishment using a specific field of system information (e.g., consisting of a one-bit flag), such as SIB 18, the network may inform the terminal of whether it is allowed to continue to perform the D2DSS transmission.

<Method 3>

Figure 19:
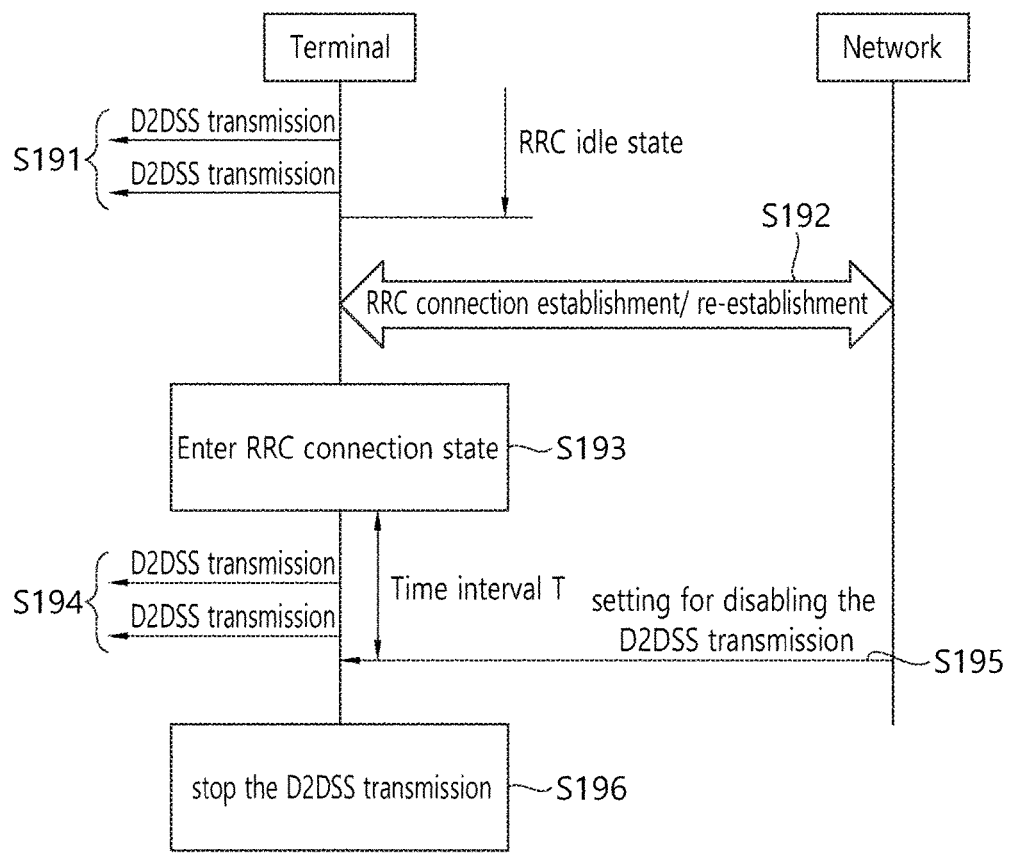
FIG. 19 shows a method of transmitting a D2DSS of a terminal according to another embodiment of the present invention.

FIG. 19 shows a method of transmitting a D2DSS of a terminal according to another embodiment of the present invention.

Referring to FIG. 19, the terminal transmits a D2DSS in the RRC idle state (S191).

The terminal proceeds to RRC connection establishment/re-establishment procedure with the network (S192) and then enters RRC connected state (S193).

After entering the RRC connected state, the terminal may continue to transmit the D2DSS for the time interval T (S194). Here, the time interval T may be the shorter time among a predetermined time or point in time at which the terminal receives the setting for disabling the D2DSS transmission from the network (S195).

For example, if the predetermined time is T1, and the time point at which receives the configuration that the D2DSS transmission is disabled from the network based on the entry point of the RRC connected state is T2, the terminal may continue to transmit the D2DSS transmission until the shorter time of T1 or T2.

If it is not receives the configuration that the D2DSS transmission may be continued in the RRC connected state, the terminal stops the D2DSS transmission after the time interval T expires (S196).

Figure 20:
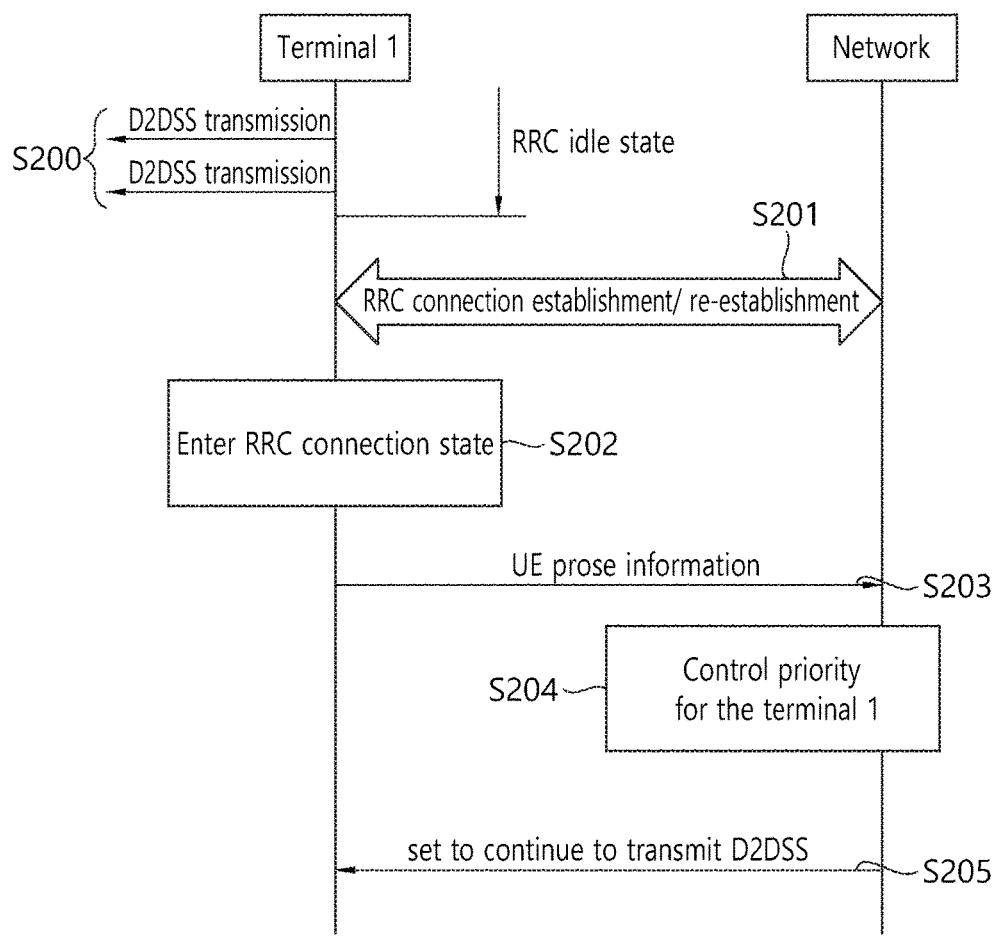
FIG. 20 shows a method of the D2DSS transmission of the terminal according to another embodiment of the present invention.

FIG. 20 shows a method of the D2DSS transmission of the terminal according to another embodiment of the present invention.

Referring to FIG. 20, a terminal 1 transmits a D2DSS in the RRC idle state (S200).

The terminal 1 goes through an RRC connection establishment/re-establishment procedure with the network (S201) and enters the RRC connected state.

When the terminal 1 enters the RRC connected state, the terminal 1 transmits the UE prose information to the network (S203). The UE prose information is information indicating that the terminal 1 is interested in receiving a signal according to the D2D operation and/or transmitting a signal according to the D2D operation, and may be an upper layer signal such as an RRC layer.

When the terminal 1 transmits the UE prose information, the terminal 1 may inform the network that the terminal 1 is the source of the D2DSS. For example, the terminal 1 may inform the network that it has transmitted the D2DSS for assisting the D2D communication to another adjacent terminal (for example, the terminal 2, the terminal 3, etc.) through the UE prose information. This indicates that the terminal 1 is transmitting the D2DSS in the RRC idle state before establishing the RRC connection with the network.

Following tables 5 and 6 below are examples of the UE prose information (indicated by ProSeUEInformation in the following table).

TABLE 5

```
ProSeUEInformation-r12-IEs ::=    SEQUENCE {
    commInterestedFreq-r12              ARFCN-ValueEUTRA-r9
        OPTIONAL,
    commTxResourceReq-r12               ProSeCommTxResourceReq-r12
        OPTIONAL,
    discInterestedFreqs-r12             CarrierFreqList-r12
        OPTIONAL,
    discTxResourceReq-r12               INTEGER (0..TBD)
        OPTIONAL,
    lateNonCriticalExtension            OCTET STRING
        OPTIONAL,
    d2dssSource                             ENUMERATE {TRUE}
        OPTIONAL,
    nonCriticalExtension                SEQUENCE { }
        OPTIONAL
}
ProSeCommTxResourceReq-r12 ::=    SEQUENCE {
    carrierFreq-r12                         ARFCN-ValueEUTRA-r9
        OPTIONAL,
    proseDestinationInfoList-r12        ProseDestinationInfoList-r12
}
ProseDestinationInfoList-r12 ::= SEQUENCE (SIZE (1..maxProseDest)) OF
```

TABLE 5-continued

```
ProseDestinatronInfo-r12
ProseDestinatronInfo-r12 ::=        SEQUENCE {
    -- FFS what information the UE sends when requesting communication
Tx resources
        proseDestinationIdentity-r12        ProseGroupIdentity-r12,
        proseDestinationIndex-r12           INTEGER (0..15)
}
ProseGroupIdentity-r12 ::=          BIT STRING (SIZE (N2))
CarrierFreqList-r12 ::=             SEQUENCE (SIZE (1..maxFreq)) OF ARFCN-
ValueEUTRA-r9
```

In Table 5. 'commInterestedFreq' is a field indicating the frequency at which the terminal is interested in D2D operation. 'CommTxResourceReq' is a field for requesting resources for signal transmission according to the D2D communication. 'DiscInterestedFreqs' is a field indicating frequencies that are of interest in the D2D discovery. 'DiscTxResourceReq' is a field for requesting resources for signal transmission according to the D2D discovery. 'D2dssSource' is a field indicating that the terminal has been a source of the D2DSS in the RRC idle state, that is, has been transmitting the D2DSS in the RRC idle state.

The 'd2dssSource' field may be added only when 1) the UE prose information includes 'commTxResourceReq', that is, a field requesting transmission resources for the D2D communication, or it may be added when 2) at least one of 'commInterestedFreq', 'commTxResourceReq', 'discInterestedFreqs', and 'discTxResourceReq is included.

sourceReq' and 'discTxResourceReq'. 4) Or the 'd2dssSource' field may be added only when the terminal includes a field for informing the frequency that the terminal is interested in the D2D operation such as 'commInterestedFreq' and 'discInterestedFreqs' in the UE prose information.

1 Through the UE prose information, the network may know that the terminal 1 is the D2DSS source that was transmitting the D2DSS in the RRC idle state. The network may control the priority for the terminal 1 (S204). The network may consider scheduling for D2D for the terminal 1, and the terminal 1 is a D2DSS source when allocating resources.

The network provides the terminal 1 with a configuration so that the terminal 1 may continue to transmit the D2DSS even in the RRC connected state (S205).

TABLE 6

```
ProSeUEInformation-r12-IEs ::=      SEQUENCE {
    commInterestedFreq-r12                  ARFCN-ValueEUTRA-r9
        OPTIONAL,
    commTxResourceReq-r12                   ProSeCommTxResourceReq-r12
        OPTIONAL,
    discInterestedFreqs-r12                 CarrierFreqList-r12
        OPTIONAL,
    discTxResourceReq-r12                   INTEGER (0..TBD)
        OPTIONAL,
    lateNonCriticalExtension                OCTET STRING
        OPTIONAL,
    nonCriticalExtension                    SEQUENCE { }
        OPTIONAL
}
ProSeCommTxResourceReq-r12 ::=      SEQUENCE {
    carrierFreq-r12                         ARFCN-ValueEUTRA-r9
        OPTIONAL,
    proseDestinationInfoList-r12    ProseDestinationInfoList-r12
    d2dssSource                             ENUMERATE {TRUE}
        OPTIONAL,
}
ProseDestinationInfoList-r12 ::= SEQUENCE (SIZE (1..maxProseDest)) OF
ProseDestinationInfo-r12
ProseDestinationInfo-r12 ::=        SEQUENCE {
    -- FFS what information the UE sends when requesting communication
Tx resources
        proseDestinationIdentity-r12        ProseGroupIdentity-r12,
        proseDestinationIndex-r12           INTEGER (0..15)
}
ProseGroupIdentity-r12 ::=          BIT STRING (SIZE (N2))
CarrierFreqList-r12 ::=             SEQUENCE (SIZE (1..maxFreq)) OF ARFCN-
ValueEUTRA-r9
```

Table 6 illustrates a case where 'd2dssSource' field is added to 'commTxResourceReq' of the UE prose information, i.e., a field for requesting a transmission resource for the D2D communication.

3) Or the 'd2dssSource' field may be added when the UE prose information includes a field for requesting transmission resources for the D2D operation such as 'commTxRe- According to this method, the network may know through the UE prose information that the terminal 1 is the D2DSS source, and may schedule appropriate D2D resources to the terminal 1, if necessary, and thus the network may continue to transmit the D2DSS even in the RRC connected state.

Therefore, even if the terminal that has transmitted the D2DSS in the RRC idle state enters the RRC connected state, the continuity of the D2DSS transmission may be supported. Therefore, the performance of the D2D operation of neighboring terminals may be improved.

Figure 21:
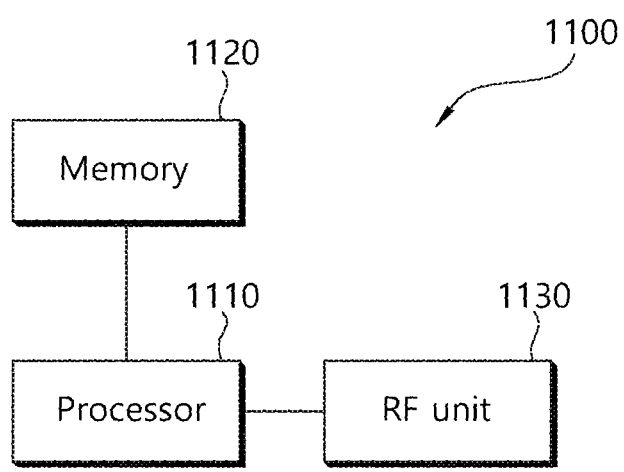
FIG. 21 is a block diagram illustrating a terminal in which an embodiment of the present invention is implemented.

FIG. 21 is a block diagram illustrating a terminal in which an embodiment of the present invention is implemented.

Referring to FIG. 21, a terminal 1100 includes a processor 1110, a memory 1120, and a radio frequency unit (RF) unit 1130. Processor 1110 implements the proposed functionality, process and/or method. For example, the processor 1110 transmits a synchronization signal (D2D synchronization signal: D2DSS) for D2D operation in a radio resource control (RRC) idle state and enters an RRC connected state. As described with reference to FIGS. 18 to 20, when the processor 1110 satisfies a certain condition, the processor 1110 may continue to transmit the D2DSS for a predetermined time even after entering the RRC connected state.

The RF unit 1130 is coupled to the processor 1110 and transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and coupled to the processor in a variety of well-known means.

What is claimed is:

1. A method for transmitting a synchronization signal for a device-to-device (D2D) operation in a wireless communication system, the method performed by a user equipment (UE) and comprising:
    transmitting a D2D synchronization signal (D2DSS) for the D2D operation in a radio resource control (RRC) idle state;
    entering an RRC connected state;
    transmitting UE ProSe information to a network, the UE ProSe information including transmission-in-idle state information informing that the UE has transmitted the D2DSS in the RRC idle state; and
    re-transmitting the D2DSS after entering the RRC connected state if a certain condition is met.

2. The method of claim 1, further comprising receiving one-bit permission information from the network informing whether continued transmission of the D2DSS is allowed when entering the RRC connected state.

3. The method of claim 2, wherein the one-bit permission information is included in system information.

4. The method of claim 2, wherein the certain condition is a condition under which the permission information is received and a measured value of a reference signal received power (RSRP) of a primary cell of the UE is less than a preset RSRP threshold.

5. The method of claim 1, wherein the D2DSS is re-transmitted in the RRC connected state until the UE receives transmission stop information from the network to disable or disconnect transmission of the D2DSS.

6. The method of claim 5, wherein the UE stops transmitting the D2DSS in the RRC connected state if a predetermined time elapses before the transmission stop information is received from the network.

7. The method of claim 1, wherein the UE ProSe information further includes a field requesting a transmission resource for a D2D communication.

8. A user equipment (UE) for transmitting a synchronization signal for a device-to-device (D2D) operation in a wireless communication system, the UE comprising:
    a radio frequency (RF) unit configured to transmit and receive a radio signal; and
    a processor operatively coupled to the RF unit and configured to:
    control the RF unit to transmit a D2D synchronization signal (D2DSS) for the D2D operation in a radio resource control (RRC) idle state;
    enter an RRC connected state;
    control the RF unit to transmit UE ProSe information to a network, the UE ProSe information including transmission-in-idle state information indicating that the UE has transmitted the D2DSS in the RRC idle state; and
    control the RF unit to re-transmit the D2DSS after entering the RRC connected state if a certain condition is met.

9. The UE of claim 8, wherein the processor is further configured to control the RF unit to receive one-bit permission information from the network indicating whether continued transmission of the D2DSS is allowed when entering the RRC connected state.

10. The UE of claim 9, wherein the one-bit permission information is included in system information.

11. The UE of claim 9, wherein the certain condition is a condition under which the permission information is received and a measured value of a reference signal received power (RSRP) of a primary cell of the UE is less than a preset RSRP threshold.

12. The UE of claim 8, wherein the processor is further configured to control the RF unit to transmit the D2DSS in the RRC connected state until the UE receives an indication from the network to disable or disconnect transmission of the D2DSS.

13. The UE of claim 12, wherein the processor is further configured to control the RF unit to stop transmitting the D2DSS in the RRC connected state if a predetermined time elapses before the indication is received from the network.

14. The UE of claim 8, wherein the UE ProSe information further includes a field requesting a transmission resource for a D2D communication.

* * * * *